No. 886,833. PATENTED MAY 5, 1908.
M. G. MELVIN.
COMBINED GAGE AND SIGNAL DEVICE.
APPLICATION FILED MAR. 16, 1907.

Witnesses
F. C. Gibson.
C. Bradway.

Inventor
Mark G. Melvin.
By Victor J. Evans
Attorney

UNITED STATES PATENT OFFICE.

MARK G. MELVIN, OF SCRANTON, PENNSYLVANIA, ASSIGNOR OF ONE-HALF TO EDWARD A. JONES, OF SCRANTON, PENNSYLVANIA.

COMBINED GAGE AND SIGNAL DEVICE.

No. 886,833.      Specification of Letters Patent.      Patented May 5, 1908.

Application filed March 16, 1907. Serial No. 362,683.

*To all whom it may concern:*

Be it known that I, MARK G. MELVIN, a citizen of the United States, residing at Scranton, in the county of Lackawanna and State of Pennsylvania, have invented new and useful Improvements in Combined Gages and Signal Devices, of which the following is a specification.

This invention relates to gages for indicating the pressure of steam or water, or the height of water in a tank, in connection with an audible electric signal which is connected in circuit at either high or low predetermined limits of pressure or height of water.

The invention has for one of its objects to improve and simplify the construction and operation of devices of this character so as to be comparatively easy and inexpensive to manufacture, thoroughly reliable and efficient in use, and capable of a large variety of applications, as for instance, it may be used as a pressure indicator for steam boilers whereby the pressure can be read at the boiler by means of the indicator dial and the maximum or minimum pressure indicated by an electric alarm located in the engineer's office or other remote point; or it may be used to indicate the height of water in a tank and to signal when the tank is full or empty.

A further object of the invention is to provide a device including an element sensitive to changes in pressure for actuating the hand of the indicator or gage and to close an electric alarm containing circuit at predetermined abnormal limits.

With these objects in view and others, as will appear as the description proceeds, the invention comprises the various novel features of construction and arrangement of parts which will be more fully described hereinafter and set forth with particularity in the claims appended hereto.

Figure 1:
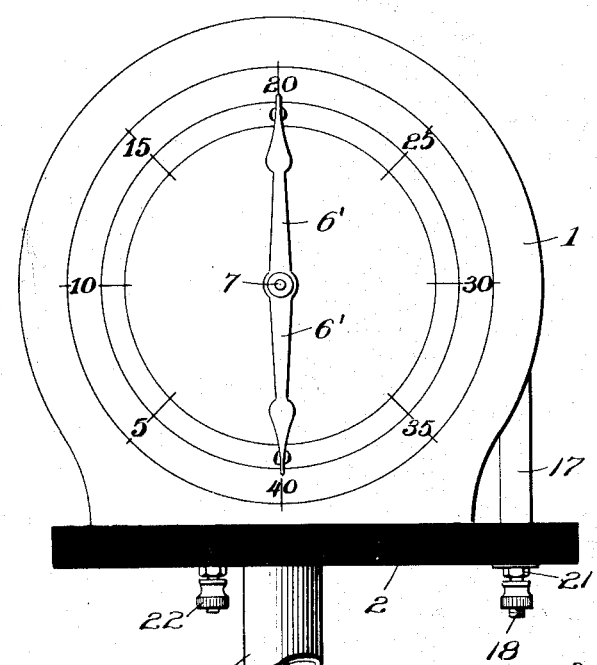
Figure 2:
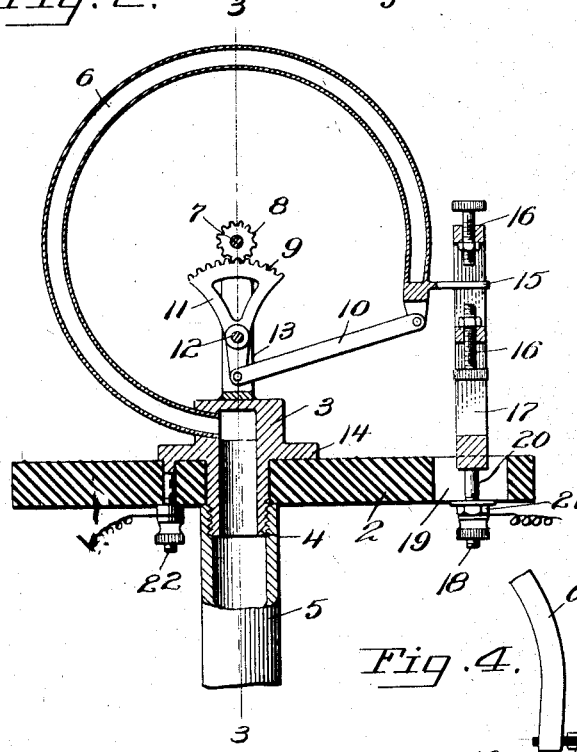
Figure 3:
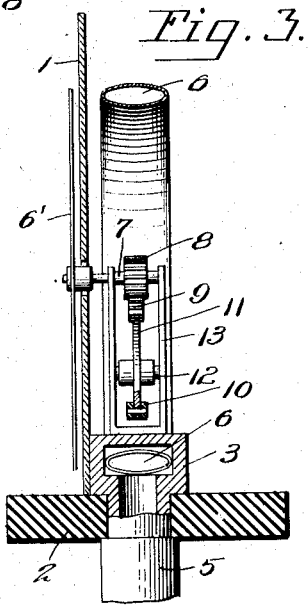
Figure 4:
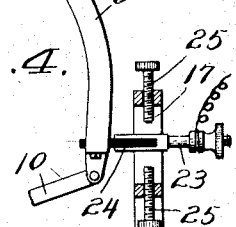

In the accompanying drawing, which illustrates one of the embodiments of the invention, Figure 1 is a front view of the gage or indicator. Fig. 2 is a vertical longitudinal section thereof. Fig. 3 is a vertical transverse section on line 3—3, Fig. 2. Fig. 4 is a detail sectional view of a modified form of circuit closing device.

Similar reference characters are employed to designate similar parts throughout the figures.

Referring to the drawing, 1 designates the casing of the gage which may be of any suitable character and mounted on a base plate 2 of wood, rubber or other insulating material. On the base plate is a hollow head 3 having a threaded coupling end 4 to which is coupled a pipe 5 which is connected with a boiler, tank or other apparatus in which the pressure or volume of the contents is to be gaged.

On the head 3 is mounted a flexible metal tube 6 that is sensitive to variations in pressure in the fluid or liquid of the system in which the gage is employed. This flexible element, which is of usual construction, is adapted to operate a double-pointed needle or hand 6' mounted on a horizontal arbor 7 by means of a pinion 8 on the arbor meshing with a sector rack 9 that receives motion through the link 10. The rack frame 11 oscillates on a shaft 12, which, with the arbor 7, is mounted on spaced uprights or standards 13 secured on the top of the head 3. By this means, the hand is actuated as the pressure in the pipe 5 and element 6 varies. On the head 3 is a lateral extension 14 that bears on the top surface of the base plate 2 and is held in position thereon by the upper end of the pipe 5 bearing against the bottom surface of the plate.

The movement of the flexible element 6 is also utilized for controlling an electric circuit that contains an audible or other signal for indicating either abnormal extremes of pressure or volume of the apparatus with which the gage is used. For this purpose, the free end of the element 6 has a laterally extending arm 15 movable between adjustable contacts 16 supported on an upright frame 17. This frame is provided with a binding post 18 for connecting it with one side of a circuit including a source of current, and the frame is adjustable toward or away from the element 6 by providing the base plate 2 with a slot 19 through which the shank of the screw 20 of the binding post extends, the said screw having a clamping nut 21 for firmly securing the frame 17 in position. The head 3 is provided with a binding post 22 with which is connected the opposite side of the electric circuit, and when by excessive movement of the element 6, the contact 15 engages either one of the contact screws 16, the circuit is completed through the binding post 18, frame 17, either one of the screws 16, flexible element 6, head 3, binding post 22 and back to the source of current supply.

In practice, assuming the gage to be used in connection with a steam boiler, the divisions in the outer circle of the dial of the gage are employed for reading the pressure of the steam in the boiler in pounds per square inch. The adjustable screws 16 are set to enable the flexible element 6 to close an electric circuit when the abnormal low or high limits of pressure at which the system is intended to operate is reached. The pressure gage enables the fireman to know at a glance what the pressure of the steam in the boiler is, while the electric alarm which may be located in the engineer's office or any other desired point, forms a safety indicating means whereby abnormal conditions may be revealed and instructions immediately given for their correction.

When the device is to be used in connection with a feed water tank for indicating the level, the inner circle of divisions on the dial of the gage is employed and the user divides this circle into units corresponding to the number of feet in the height of the tank, as for instance, in a ten-foot tank, the range of movement of the upper end of the hand 6' corresponding to a full or empty tank, would be divided into ten units so that the height of water in the tank would be indicated by the position of the upper end of the hand 6' with relation to this scale. The screws 16 would then be adjusted to such a position that the circuit would be completed when the tank was either full or empty, thus sounding the alarm and warning the engineer that the water supply must be either opened or closed, as the case may be.

In the modification shown in Fig. 4, the free end of the flexible element 6 carries a contact 23 having a binding post that is mounted on a block of insulation 24 secured to the said element and the contact 23 is adapted to make contact with either one of the adjustable contact screws 25 when the flexible element reaches either extreme limit of its movement. In this form, the circuit is completed through the binding post connected with the frame 17, either one of the screws 25, contact 23, and back to the source of supply.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative and that such changes may be made when desired, as are within the scope of the claims.

Having thus described the invention, what I claim is:—

1. In an apparatus of the class described, the combination of an indicator or gage including a flexible element sensitive to pressure variations, with an alarm containing circuit, and a switch actuated by the said element for controlling the circuit, said switch comprising a contact carried by and mounted directly on the movable element, means for connecting one side of the circuit thereto, and a pair of adjustable contacts disposed on opposite sides of the first-mentioned contact and connected with the opposite side of the circuit.

2. In an apparatus of the class described, the combination of an indicator including a flexible element sensitive to pressure variation, with a signal-containing circuit, a binding post connected with the element, and a switch for controlling the circuit at either extreme limit of movement of the element, said switch comprising a contact fixed on the element, a frame connected with the circuit, adjustable contact screws on the frame disposed at opposite sides of the first-mentioned contact, and a binding post on the frame.

3. In an apparatus of the class described, the combination of an indicator comprising a base-plate, a dial mounted thereon, a flexible element sensitive to pressure variations, a needle movable over the dial, and means between the flexible element and needle for actuating the latter, with an alarm including circuit, and a switch for controlling the circuit, said switch comprising a contact-carrying frame adjustable bodily back and forth on the base plate, contacts on the frame, and a contact on the flexible element to directly engage the first-mentioned contacts.

4. In an apparatus of the class described, the combination of a base plate having an aperture, a head provided with a flange engaging one side of the base plate and provided with a tubular portion extending through the opening of the latter, a pipe communicating with the head and connected with the said portion for holding the head in fixed position on the plate, a binding post connected with the head, a flexible element communicating with the head and sensitive to pressure variation, a contact carried by the element, said element forming part of a circuit, a stationary contact arranged in co-operative relation with the contact on the element, and a binding post for connecting the conductor with the stationary contact.

In testimony whereof, I affix my signature in presence of two witnesses.

MARK G. MELVIN.

Witnesses:
J. W. CARPENTER,
WALLACE G. MOSER.